Dec. 4, 1951        N. A. PALMGREN        2,577,589
DOUBLE-ROW ROLLER BEARING
Filed Oct. 6, 1949
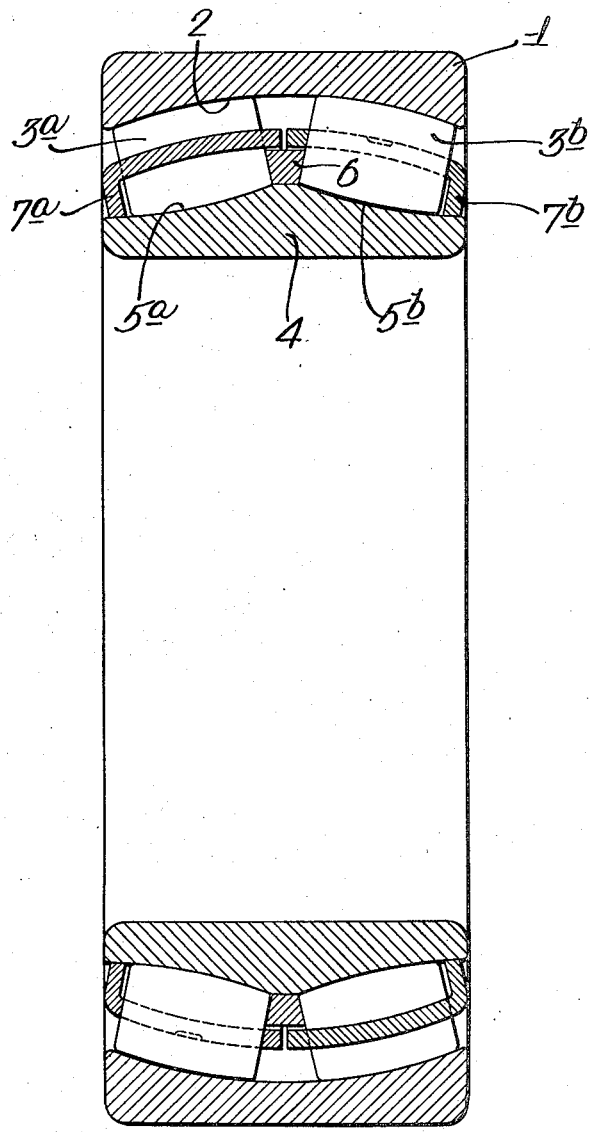
Inventor:
Nils Arvid Palmgren
by his Attorneys
Howson &
Howson Patented Dec. 4, 1951

2,577,589

UNITED STATES PATENT OFFICE 2,577,589

DOUBLE-ROW ROLLER BEARING

Nils Arvid Palmgren, Goteborg, Sweden, assignor to Aktiebolaget Svenska Kullagerfabriken, Goteborg, Sweden, a corporation of Sweden Application October 6, 1949, Serial No. 119,819
In Sweden November 5, 1948

1 Claim. (Cl. 308—212)

The present invention relates to a self-aligning roller bearing having qualities, which in various ways are superior to those of hitherto known types of roller bearings. The invention, which is applicable to double-row bearings, is characterized mainly by the combination of symmetrical rollers, loose guide ring between the rows of rollers, and cages of window type.

The invention is illustrated on the accompanying drawing, which shows a section through one form of a bearing. The outer ring I of the bearing is provided internally with a spherical race 2 common to both the rows of rollers 3a and 3b. The inner ring 4 is provided with two races 5a and 5b, one for each row of rollers, the races being concavely arcuate in profile. The rollers 3a and 3b are barrel-shaped and conform closely in profile to the races of the rings. The profiles of their rolling surfaces are convexly curved and are symmetrical about the central median planes of the rollers. The rolling surfaces of the rollers are thus symmetrical. The end faces of the rollers may be either plane or slightly convex. The end faces may differ in form, for instance one may be slightly concave and the other slightly convex, but the roller may be considered to be symmetrical as long as its greatest diameter is located at the middle of the roller, since it is the form of the rolling surface, which chiefly determines many of the characteristics of the bearing.

A loose guide ring 6 is fitted between the rows of rollers and centered on the inner ring and is axially displaceable relative to the ring. Its position is accurately determined by the rows of rollers, since it fills the space between the rows of rollers when the rollers assume their axial positions of equilibrium as determined by the races. The contact surface between the guide ring and the roller ends is relatively long in the peripheral direction of the bearing, whereby the rollers are maintained with comparatively great accuracy in positions in which the roller axes intersect the axis of the bearing. The accuracy with which the guide ring guides the rollers is greater than that which can be obtained with a cage, as long as the bearing is subjected only or mainly to radial load. When the load is purely or mainly thrust, the capacity of the guide ring to guide the rollers is decreased as a result of the play that occurs between the guide ring and the roller ends due to elastic deformation of the parts and slackness in the bearing. In order that the bearing may function in the best manner under all conditions of use it is therefore necessary that it be designed for combined guiding by means of both guide ring and cage.

The rollers are separated and are guided by cages 7a and 7b, one for each row of rollers. This cage is of the window type, i. e. it comprises an annular body in which closed window-like pockets for the rollers are provided. These pockets conform to the shape of the rollers with a minimum of play and therefore contribute to the greatest possible degree to guiding the rollers. Integral annular parts of the cage remain at both sides of the rollers and impart considerable mechanical mechanical strength to the cage, even though the thickness of the material is small, especially at the part of the cage located between the rows of rollers. The design of the cage is therefore of vital importance as regards the possibility of making a wide bearing and therefore vitally influences the load carrying capacity of the bearing.

The most important properties of a bearing are its load carrying capacity, its frictional qualities and the cost at which it may be made. The load carrying capacity is as a rule the most important of these. It is difficult to explain fully the manner in which the combination in which the invention consists influences these different properties because of the complicated nature of the interaction of the elements of the combination and the varying aspects of the bearing properties. To begin with it is possible to explain the properties of the elements separately and in combination with one of the other elements of the combination.

The cost of making the symmetrical roller is relatively low, especially if the end faces are made plane. The symmetrical rolling surface provides the greatest possibility of lowering the stresses at the contact and the stresses in the roller in general to a minimum and to retain them at a minimum for all load combinations on the bearing. This possibility is realized through the combination with the loose guide ring. Since the guide ring is loose, i. e. it is not made integral with any of the bearing rings the otherwise unavoidable grooves at the junction of race and flange surface which encroach upon the width of the races and diminish the effective roller length and the load carrying capacity of the bearing may be dispensed with. Since the guide ring is loose, i. e. axially displaceable together with the rows of rollers and the rollers are symmetrical the rollers will retain their momentary positions of equilibrium as determined by the races, even if the rings become axially displaced relative to each other because of thrust on the bearing. The distribution of pressure on the rollers can therefore be maintained at the most favourable and there will be nothing to prevent the conformity of rollers to race from being made so great that the contact stresses will be an absolute minimum. The loose guide ring also permits of an increase in the total length of the roller by the elimination of fixed flanges, which must be made with a certain, not too small, breadth in order that they may be hardened without cracking. All of these conditions, which contribute to an increase in the load carrying capacity of the bearing, are thus a result of the use of a loose guide ring and of the combination of such a ring with symmetrical rollers.

The importance of the window-type cage has been mentioned above. This type of cage effectively contributes to the guidance of the roller and the bearing width and thus the load carrying capacity of the bearing can be increased without the mechanical strength of the cage becoming insufficient. The guiding capacity of the cage is of great importance because the loose guide ring is not quite as effective as a fixed guide flange, at least for thrust loads, and further because the symmetrical roller has a somewhat greater tendency to skew than the unsymmetrical roller, which conforms more closely to the theoretical rolling cone. There is thus an interaction between all three of the elements of the combination which determine the qualities of the bearing and make them superior to those of known designs.

This superiority may of course vary quantitatively with the dimension and proportions of the bearing and also with its working conditions. The average magnitude of the advantages can however be indicated on the basis of the experimental research which has been carried out. The easiest method of doing this is to examine the results of eliminating the elements of the combination one at a time. Five different cases may be examined, namely:

1. If the symmetrical rollers are replaced by a symmetrical roller the average load carrying capacity is decreased by 10% and the cost of producing the bearing is increased by 10%.

2. If the loose guide ring is replaced by a fixed guide ring the load carrying capacity is decreased by 30% and the cost of making the bearing increases by 5%.

3. If the loose guide ring is removed the friction in the bearing increases by 15%.

4. If the window-type cage is replaced by a roller guiding cage with open pockets the attainable load carrying capacity of the bearing is decreased by 20%.

5. If the window-type cage is replaced by a non-guiding cage with open pockets the bearing friction is increased by 15% and the attainable load carrying capacity is decreased by 20%.

From the above it is clearly apparent that none of the elements of the combination can be eliminated without a considerable deterioration in the quality of the bearing. The combination thus results in a considerable advance in roller bearing engineering.

I claim:

A roller bearing having an inner race ring, an outer race ring and two rows of rollers with symmetrical rolling surfaces interposed between said rings, cage means of window type, one of said race rings having a raceway forming a zone of a sphere and common to both of the rows of rollers, the other of said race rings having a separate race for each of said rows and a cylindrical surface between the said races, and a guide ring disposed between the rows of rollers and having a cylindrical surface slidably centered on the cylindrical surface of the race ring and axially movable thereon.

NILS ARVID PALMGREN.

REFERENCES CITED

The following references are of record in the file of this patent:

UNITED STATES PATENTS

| Number | Name | Date |
|---|---|---|
| 1,914,548 | Wingquist | June 20, 1933 |
| 2,387,962 | Williams | Oct. 30, 1945 |

FOREIGN PATENTS

| Number | Country | Date |
|---|---|---|
| 77,292 | Sweden | Mar. 15, 1932 |